US008917075B2

(12) United States Patent  
Leipold et al.

(10) Patent No.: US 8,917,075 B2  
(45) Date of Patent: Dec. 23, 2014

(54) SWITCHED INDUCTOR DC-DC CONVERTER

(75) Inventors: Dirk Leipold, Califon, NJ (US); Adam Dolin, Springfield, NJ (US); Paul Sheehy, Easton, PA (US)

(73) Assignee: Anadigics, Inc., Warren, NJ (US)

( * ) Notice: Subject to any disclaimer, the term of this patent is extended or adjusted under 35 U.S.C. 154(b) by 150 days.

(21) Appl. No.: 13/286,660

(22) Filed: Nov. 1, 2011

(65) Prior Publication Data  
US 2012/0105040 A1 May 3, 2012

Related U.S. Application Data

(60) Provisional application No. 61/408,904, filed on Nov. 1, 2010.

(51) Int. Cl.  
*G05F 1/00* (2006.01)  
*H02M 3/158* (2006.01)  
*G05F 1/24* (2006.01)  
*H02J 1/10* (2006.01)

(52) U.S. Cl.  
CPC .......... *H02M 3/1582* (2013.01); *H02M 3/1584* (2013.01)  
USPC ............................... 323/284; 323/259; 363/65

(58) Field of Classification Search  
USPC ...................... 323/282–285, 259; 363/65, 259  
See application file for complete search history.

(56) References Cited

U.S. PATENT DOCUMENTS 7,102,339 B1 * 9/2006 Ferguson ...................... 323/284  
2011/0018519 A1 * 1/2011 Chatroux et al. ............. 323/299

* cited by examiner

Primary Examiner — Adolf Berhane  
Assistant Examiner — Henry Lee, III  
(74) Attorney, Agent, or Firm — Ward & Zinna, LLC

(57) ABSTRACT

A direct current to direct current (DCDC) voltage converter is described comprising a controller and at least one converter circuit. The converter circuit comprises at least first and second inductors, each having an input and an output; a first input switch connected to the input of the first inductor; a second input switch connected to the input of the second inductor; and an output switch connected to the outputs of the inductors for selectively combining the outputs to form a parallel combination of the inductors or a series combination of the inductors. The controller generates signals for selectively connecting the first and second input switches and the output circuit between a pair of power supply input terminals and a pair of power supply output terminals. In response to appropriate signals from the controller, the converter circuit can be operated as a buck converter or a boost converter.

21 Claims, 2 Drawing Sheets

SWITCHED INDUCTOR DC-DC CONVERTER

This application claims benefit of provisional application Ser. No. 61/408,904, filed Nov. 1, 2010, for SWITCHED INDUCTOR DC-DC CONVERTER WITH DIGITAL BURST CONTROL, DAC FUNCTION AND SWITCHABLE INDUCTOR SIZE, which is incorporated herein in its entirety.

BACKGROUND

DC-DC converters are electrical devices used to convert direct current (DC) electrical power from one voltage level to another. They are widely used wherever batteries are the primary source of electric power and in many other applications as well. One such use is in power amplifiers (PA); and the present invention will be described in that context. However, it will be apparent that the invention may be practiced in numerous other contexts as well.

While the use of DC-DC converters for PA systems is increasing, in most cases a high value external inductor is used with slow switching speeds. As a result, the DC-DC converter is not fast enough to modulate the RF envelope or the RF ramp directly, but an additional load dropout (LDO) regulator in series with the switcher is used. This increases the system losses. In addition, the external inductor consumes valuable additional board space and prevents integration of the DC-DC converter in the PA module.

BRIEF DESCRIPTION OF DRAWING

The invention will be more readily apparent from the following Detailed Description in which.

DETAILED DESCRIPTION

Figure 1:
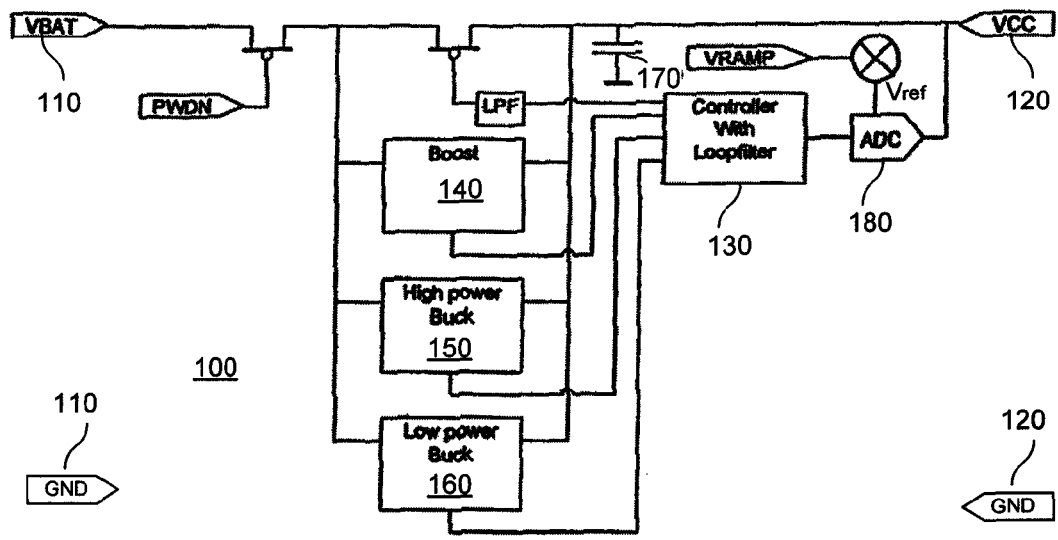
FIG. 1 is a block diagram of an illustrative embodiment of a DC-DC converter in which the invention may be practiced.

To optimize power consumption in a PA system it is preferable to have an adjustable voltage at the collector node. To do this, it is beneficial to use a DC-DC converter based on a switched inductor. Such converters can reach high power added efficiencies (>90%). This allows optimization of the load line for highest power added efficiency. As it is common to control the output power of a saturated power amplifier by controlling the collector supply voltage, such a power amplifier and the power ramp of such a power amplifier have to have fast ramp times. It is also beneficial if such a DC-DC converter has a very fast switching speed. For GSM applications a ramp time of about 1 microsecond (usec.) is needed, so switching speeds of 5 MHz and faster are required. As the inductor's size needed for minimal ripple scales with the switching speed, one can design a DC-DC converter with an inductor small enough to be realized as a printed component in the laminate or on a silicon chip. This allows the construction of a very compact system with an integration of the switcher within the power amplifier module.

An inductor size of 5-20 nanoHenries (nH) is about the maximum range realizable with printed laminate or on-chip components with present technology. To shrink the inductor to this size, it is necessary to use very high speed switcher with operating frequencies of 100 MHz and more. However, since the switching transistors cannot be operated efficiently with analog control of the pulse width of the switching transistors, digital control of a sequence of pulse bursts is needed. This allows the regulation loop to run at low speeds (5-10 million samples/second) while the switching occurs at very high speeds (100-200 MHz). This, in turn, allows a pulse stream to be generated in which the frequency spectrum of the ripple is shaped such that the critical frequency bands in the power amplifier system do not see this switching noise of the DC-DC converter. Furthermore, this burst can be split for multiple transistor banks allowing the driver current consumption to be optimized for the power delivered. In addition these banks of transistors can be connected to individual metal traces of the inductor as required by the slotting rules of the CMOS technology. By introducing additional cross switch transistors, the number of turns in the inductor can be changed, allowing the inductance to be increased for low current loads to reduce the ripple.

To use a DC-DC converter in a power amplifier system, it is desirable to cover a large range of voltage conversion ratios, typically more than 10:1. At the same time, the load resistance of the PA will change in a deterministic manner dependent on what power level is targeted. Because the state of the power amplifier is known, an intelligent controller is used to build the DC-DC converter with multiple sub-power converters tied to a common output node. This allows the component for each converter to be optimized to achieve best power efficiency.

As a low power converter should have more series inductance and a smaller switching transistor size to get the best power performance, it is advantageous to form the main inductor for high power switcher out of multiple sub-inductors. As a high current inductor needs a very wide trace for the inductor winding, this metal trace needs to be split into multiple sub-traces to avoid metal stress in the semiconductor process (so called slotting the metal trace). It is now possible use all these traces as separate coupled inductors and to add a switch matrix to these traces.

FIG. 1 is a functional block diagram of an illustrative embodiment of a DC-DC converter 100 that incorporates certain of these features. The converter comprises input terminals 110 designated VBAT and GND, output terminals 120 designated VCC and GND, controller 130, a boost circuit 140, a high power buck circuit 150, a low power buck circuit 160 and a capacitor 170. Controller 130 controls switches in boost circuit 140, high power buck circuit 150 and low power buck circuit 160 as will be described in greater detail below in conjunction with the description of FIGS. 2 and 3. Controller 130 operates as feedback system that regulates the output voltage VCC so that it approaches a reference voltage VREF. An analog-to-digital converter (ADC) 180 converts the output voltage VCC to digital values for use in the feedback system. Advantageously, the same circuit topology can be used for the boost circuit 140, the high power buck circuit 150 and the low power buck circuit 160 with differences in the inductances and switching transistor sizes of the circuit elements as will also be described in conjunction with the description of FIG. 2. And in some applications, it is contemplated that the functions of boost circuit 140, buck circuit 150, and buck circuit 160 can be realized in physically the same circuit.

Figure 2:
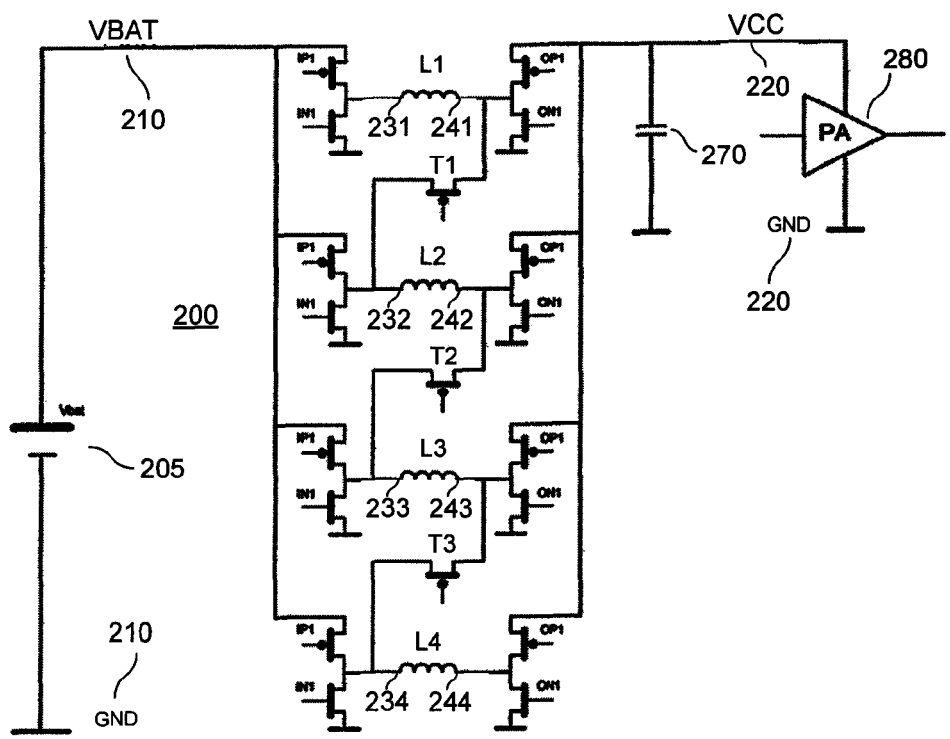
FIG. 2 is a schematic diagram of an illustrative embodiment of an inductor of the present invention.

FIG. 2 is a circuit diagram of an illustrative embodiment of a DC-DC converter circuit 200 of the present invention. Converter circuit 200 comprises input power terminals 210 designated VBAT and GND, output power terminals 220 designated VCC and GND, first, second, third and fourth inductors L1, L2, L3, L4, and a capacitor 270. A battery 205 is connected between input power terminals 210; and a power amplifier 280 is connected between output power terminals 220. Each inductor L1, L2, L3, L4 has an input 231, 232, 233, 234, respectively, and an output 241, 242, 243, 244, respectively.

Two transistor switches IPn and INn are connected to the input of each inductor Ln and two transistor switches OPn and ONn are connected to each inductor output. In particular, switches IP1 and IN1 are connected in series between the input power terminals 210 with a node between switches IP1 and IN1 being connected to input 231 of inductor L1; switches IP2 and IN2 are connected in series between the input power terminals 210 with a node between switches IP2 and IN2 being connected to input 232 of inductor L2; switches IP3 and IN3 are connected in series between the input power terminals 210 with a node between switches IP3 and IN3 being connected to input 233 of inductor L3; and switches IP4 and IN4 are connected in series between the input power terminals 210 with a node between switches IP4 and IN4 being connected to input 234 of inductor L4. Similarly, switches OP1 and ON1 are connected in series between the output power terminals 220 with a node between switches OP1 and ON1 being connected to output 241 of inductor L1; switches OP2 and ON2 are connected in series between the output power terminals 220 with a node between switches OP2 and ON2 being connected to output 242 of inductor L2; switches OP3 and ON3 are connected in series between the output power terminals 220 with a node between switches OP3 and ON3 being connected to output 243 of inductor L3; and switches OP4 and ON4 are connected in series between the output power terminals 220 with a node between switches OP4 and ON4 being connected to output 244 of inductor L4. Further, a series connection transistor switch Tn connects the output of each inductor except the last to the input of the next inductor. In particular, T1 connects output 241 of inductor L1 to input 232 of inductor L2; a switch T2 connects output 242 of inductor L2 to input 233 of inductor L3; and a switch T3 connects output 243 of inductor L3 to input 234 of inductor L4.

As will be described below, circuit 200 may be used as a buck converter to reduce DC voltage applied at its input or as a boost converter to increase applied voltage. In addition, the inductors may be connected in parallel, in series or in a combination of series and parallel. For series operation, the output of each inductor except the last is connected to the input of the next inductor by a switch Tn; the input of the first inductor is connected to an input switch IP1 or IN1; and the output of the last inductor is connected to an output switch OP4 or ON4. For parallel operation, the input of each inductor is connected to an input switch; and the output of each inductor is connected to an output switch. For series/parallel operation, the output of the first inductor is connected to the input of the second inductor and the output of the third inductor is connected to the input of the fourth inductor; the input of the first inductor is connected to an input switch IP1 or IN1; the output of the second inductor is connected to an output switch OP2 or ON2; the input of the third inductor is connected to an input switch IP3 or IN3; and the output of the fourth inductor is connected to an output switch OP4 or ON4.

For operation as a buck converter in parallel mode, the input of each inductor is switched between battery voltage VBAT and ground GND and back again. The ratio of the time D when the inductor is connected to battery voltage to the time T between the onset of successive switching cycles is the duty cycle D/T; and the output voltage VCC is VBAT*(D/T)*(efficiency of converter). Typical converter efficiencies may be in excess of 90%. To produce the highest buck output voltage, the inductors L1-L4 are operated in parallel, thereby producing the smallest circuit inductance and the smallest circuit resistance. Parallel operation is achieved by connecting the outputs of the inductors Ln to capacitor 270 via switches OPn and repeatedly and simultaneously connecting the input of each inductor Ln to VBAT through switch IPn for time D and then connecting the input of each inductor Ln to GND through switch INn for the remainder of the period T.

The operation of converter 200 as a buck converter in parallel mode for duty cycles of $1/16$, $5/16$ and $13/16$ is summarized in TABLE 1 below. Each column of TABLE 1 represents $1/16$ of the time T between successive switching cycles. Each row represents the operational status of one of input transistor switches IPn, INn, output transistor switches OPn, ONn, and series connecting transistor switches Tn, where 1 indicates that the transistor switch is conducting and 0 indicates that the transistor switch is not conducting. As will be apparent, the INn transistor switching sequence is the complement of the IPn transistor switching sequence padded by a 0 on each side to ensure that the switching sequences do not overlap.

TABLE 1

| | parallel buck mode $1/16$ power | | | | | | | | | | | | | | | | parallel buck mode $5/16$ power | | | | | | | | | |
|---|---|---|---|---|---|---|---|---|---|---|---|---|---|---|---|---|---|---|---|---|---|---|---|---|---|---|
| | P1 | P2 | P3 | P4 | P5 | P6 | P7 | P8 | P9 | P10 | P11 | P12 | P13 | P14 | P15 | P16 | P1 | P2 | P3 | P4 | P5 | P6 | P7 | P8 | P9 | P10 |
| IP1 | 1 | 0 | 0 | 0 | 0 | 0 | 0 | 0 | 0 | 0 | 0 | 0 | 0 | 0 | 0 | 0 | 1 | 1 | 1 | 1 | 1 | 0 | 0 | 0 | 0 | 0 |
| IP2 | 1 | 0 | 0 | 0 | 0 | 0 | 0 | 0 | 0 | 0 | 0 | 0 | 0 | 0 | 0 | 0 | 1 | 1 | 1 | 1 | 1 | 0 | 0 | 0 | 0 | 0 |
| IP3 | 1 | 0 | 0 | 0 | 0 | 0 | 0 | 0 | 0 | 0 | 0 | 0 | 0 | 0 | 0 | 0 | 1 | 1 | 1 | 1 | 1 | 0 | 0 | 0 | 0 | 0 |
| IP4 | 1 | 0 | 0 | 0 | 0 | 0 | 0 | 0 | 0 | 0 | 0 | 0 | 0 | 0 | 0 | 0 | 1 | 1 | 1 | 1 | 1 | 0 | 0 | 0 | 0 | 0 |
| IN1 | 0 | 0 | 1 | 1 | 1 | 1 | 1 | 1 | 1 | 1 | 1 | 1 | 1 | 1 | 1 | 0 | 0 | 0 | 0 | 0 | 0 | 0 | 1 | 1 | 1 | 1 |
| IN2 | 0 | 0 | 1 | 1 | 1 | 1 | 1 | 1 | 1 | 1 | 1 | 1 | 1 | 1 | 1 | 0 | 0 | 0 | 0 | 0 | 0 | 0 | 1 | 1 | 1 | 1 |
| IN3 | 0 | 0 | 1 | 1 | 1 | 1 | 1 | 1 | 1 | 1 | 1 | 1 | 1 | 1 | 1 | 0 | 0 | 0 | 0 | 0 | 0 | 0 | 1 | 1 | 1 | 1 |
| IN4 | 0 | 0 | 1 | 1 | 1 | 1 | 1 | 1 | 1 | 1 | 1 | 1 | 1 | 1 | 1 | 0 | 0 | 0 | 0 | 0 | 0 | 0 | 1 | 1 | 1 | 1 |
| OP1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| OP2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| OP3 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| OP4 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| ON1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| ON2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| ON3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| ON4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| T1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| T2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| T3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| T4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

TABLE 1-continued

| | | parallel buck mode 5/16 power | | | | | parallel buck mode 13/16 power | | | | | | | | | | | | | |
|---|---|---|---|---|---|---|---|---|---|---|---|---|---|---|---|---|---|---|---|---|
| | | P11 | P12 | P13 | P14 | P15 | P16 | P1 | P2 | P3 | P4 | P5 | P6 | P7 | P8 | P9 | P10 | P11 | P12 | P13 | P14 |
| IP1 | 0 | 0 | 0 | 0 | 0 | 0 | 1 | 1 | 1 | 1 | 1 | 1 | 1 | 1 | 1 | 1 | 1 | 1 | 1 | 0 |
| IP2 | 0 | 0 | 0 | 0 | 0 | 0 | 1 | 1 | 1 | 1 | 1 | 1 | 1 | 1 | 1 | 1 | 1 | 1 | 1 | 0 |
| IP3 | 0 | 0 | 0 | 0 | 0 | 0 | 1 | 1 | 1 | 1 | 1 | 1 | 1 | 1 | 1 | 1 | 1 | 1 | 1 | 0 |
| IP4 | 0 | 0 | 0 | 0 | 0 | 0 | 1 | 1 | 1 | 1 | 1 | 1 | 1 | 1 | 1 | 1 | 1 | 1 | 1 | 0 |
| IN1 | 1 | 1 | 1 | 1 | 1 | 0 | 0 | 0 | 0 | 0 | 0 | 0 | 0 | 0 | 0 | 0 | 0 | 0 | 0 | 0 |
| IN2 | 1 | 1 | 1 | 1 | 1 | 0 | 0 | 0 | 0 | 0 | 0 | 0 | 0 | 0 | 0 | 0 | 0 | 0 | 0 | 0 |
| IN3 | 1 | 1 | 1 | 1 | 1 | 0 | 0 | 0 | 0 | 0 | 0 | 0 | 0 | 0 | 0 | 0 | 0 | 0 | 0 | 0 |
| IN4 | 1 | 1 | 1 | 1 | 1 | 0 | 0 | 0 | 0 | 0 | 0 | 0 | 0 | 0 | 0 | 0 | 0 | 0 | 0 | 0 |
| OP1 | 1 | 1 | 1 | 1 | 1 | 1 | 1 | 1 | 1 | 1 | 1 | 1 | 1 | 1 | 1 | 1 | 1 | 1 | 1 | 1 |
| OP2 | 1 | 1 | 1 | 1 | 1 | 1 | 1 | 1 | 1 | 1 | 1 | 1 | 1 | 1 | 1 | 1 | 1 | 1 | 1 | 1 |
| OP3 | 1 | 1 | 1 | 1 | 1 | 1 | 1 | 1 | 1 | 1 | 1 | 1 | 1 | 1 | 1 | 1 | 1 | 1 | 1 | 1 |
| OP4 | 1 | 1 | 1 | 1 | 1 | 1 | 1 | 1 | 1 | 1 | 1 | 1 | 1 | 1 | 1 | 1 | 1 | 1 | 1 | 1 |
| ON1 | 0 | 0 | 0 | 0 | 0 | 0 | 0 | 0 | 0 | 0 | 0 | 0 | 0 | 0 | 0 | 0 | 0 | 0 | 0 | 0 |
| ON2 | 0 | 0 | 0 | 0 | 0 | 0 | 0 | 0 | 0 | 0 | 0 | 0 | 0 | 0 | 0 | 0 | 0 | 0 | 0 | 0 |
| ON3 | 0 | 0 | 0 | 0 | 0 | 0 | 0 | 0 | 0 | 0 | 0 | 0 | 0 | 0 | 0 | 0 | 0 | 0 | 0 | 0 |
| ON4 | 0 | 0 | 0 | 0 | 0 | 0 | 0 | 0 | 0 | 0 | 0 | 0 | 0 | 0 | 0 | 0 | 0 | 0 | 0 | 0 |
| T1 | 0 | 0 | 0 | 0 | 0 | 0 | 0 | 0 | 0 | 0 | 0 | 0 | 0 | 0 | 0 | 0 | 0 | 0 | 0 | 0 |
| T2 | 0 | 0 | 0 | 0 | 0 | 0 | 0 | 0 | 0 | 0 | 0 | 0 | 0 | 0 | 0 | 0 | 0 | 0 | 0 | 0 |
| T3 | 0 | 0 | 0 | 0 | 0 | 0 | 0 | 0 | 0 | 0 | 0 | 0 | 0 | 0 | 0 | 0 | 0 | 0 | 0 | 0 |
| T4 | 0 | 0 | 0 | 0 | 0 | 0 | 0 | 0 | 0 | 0 | 0 | 0 | 0 | 0 | 0 | 0 | 0 | 0 | 0 | 0 |

For operation as a buck converter in serial mode, the inductors are connected in series by connecting the output of each inductor except the last to the input of the next inductor using a switch Tn, connecting the output of the last inductor to the capacitor 270 via switch OP4, and repeatedly switching the input of the first inductor between battery voltage VBAT and ground GND using switches IP1 and IN1. Again, the ratio of the time D when the inductor is connected to battery voltage to the time T between the onset of successive switching cycles is the duty cycle D/T; and the output voltage VCC is VBAT*(D/T) (efficiency of converter).

For operation as a buck converter in series/parallel mode, the first and second inductors are connected in series by connecting the output of the first inductor to the input of the second inductor using switch T1; and the third and fourth inductors are connected in series by connecting the output of the third inductor to the input of the fourth inductor using switch T3. The outputs of the second and fourth inductors are connected to capacitor 270 by switches OP2 and OP4, respectively. The inputs of the first inductor and the third inductor are repeatedly and simultaneously switched between battery voltage VBAT and ground GND using switches IP1, IN1 and IP3, IN3, respectively.

For operation as a boost converter in parallel mode, the input of each inductor is connected by an input switch IPn to battery voltage VBAT while the output of each inductor is repeatedly and simultaneously switched by switches ONn and OPn between ground GND and capacitor 270. Since the inductors are in parallel, the inductance and resistance in this circuit are lowest, thereby providing for highest current flow. The output voltage VCC is VBAT*(T/(T−D))*(efficiency of converter).

For operation as a boost converter in series mode, the inductors are connected in series by connecting the output of each inductor except the last to the input of the next inductor using a switch Tn, connecting the input of the first inductor to battery voltage VBAT using switch IP1; and using switches ON4 and OP4 to alternately switch the output of the fourth inductor between ground GND and capacitor 270.

For operation as a boost converter in series/parallel mode, the first and second inductors are connected in series by connecting the output of the first inductor to the input of the second inductor using switch T1; and the third and fourth inductors are connected in series by connecting the output of the third inductor to the input of the fourth inductor using switch T3. The inputs of the first and third inductors are connected by switches IP1 and IP3, respectively to battery voltage VBAT. The outputs of the second and fourth inductors are repeatedly and simultaneously switched between ground GND and capacitor 270 by switches ON2 and OP2 and switches ON4 and OP4, respectively.

From the foregoing discussion, it will be evident that converter circuit 200 can be used as either a buck converter or as a boost converter. For the case where each inductor Ln has the same inductance, the combined inductance of the four inductors Ln can be switched over a range of 16:1 between a parallel combination of the four inductors and a serial combination of the four inductors. In some applications, these capabilities to operate as either a buck converter or a boost converter and a 16:1 range in circuit inductance may be enough to permit the use of a single converter circuit 200 to realize the functionality of the boost converter, the low power buck converter and the high power buck converter depicted in FIG. 1 in a single physical circuit. In other cases, it may be desirable to use multiple converter circuits 200 in which the switching transistors and inductors are sized to get the best power performance at specific power levels.

Figure 3:
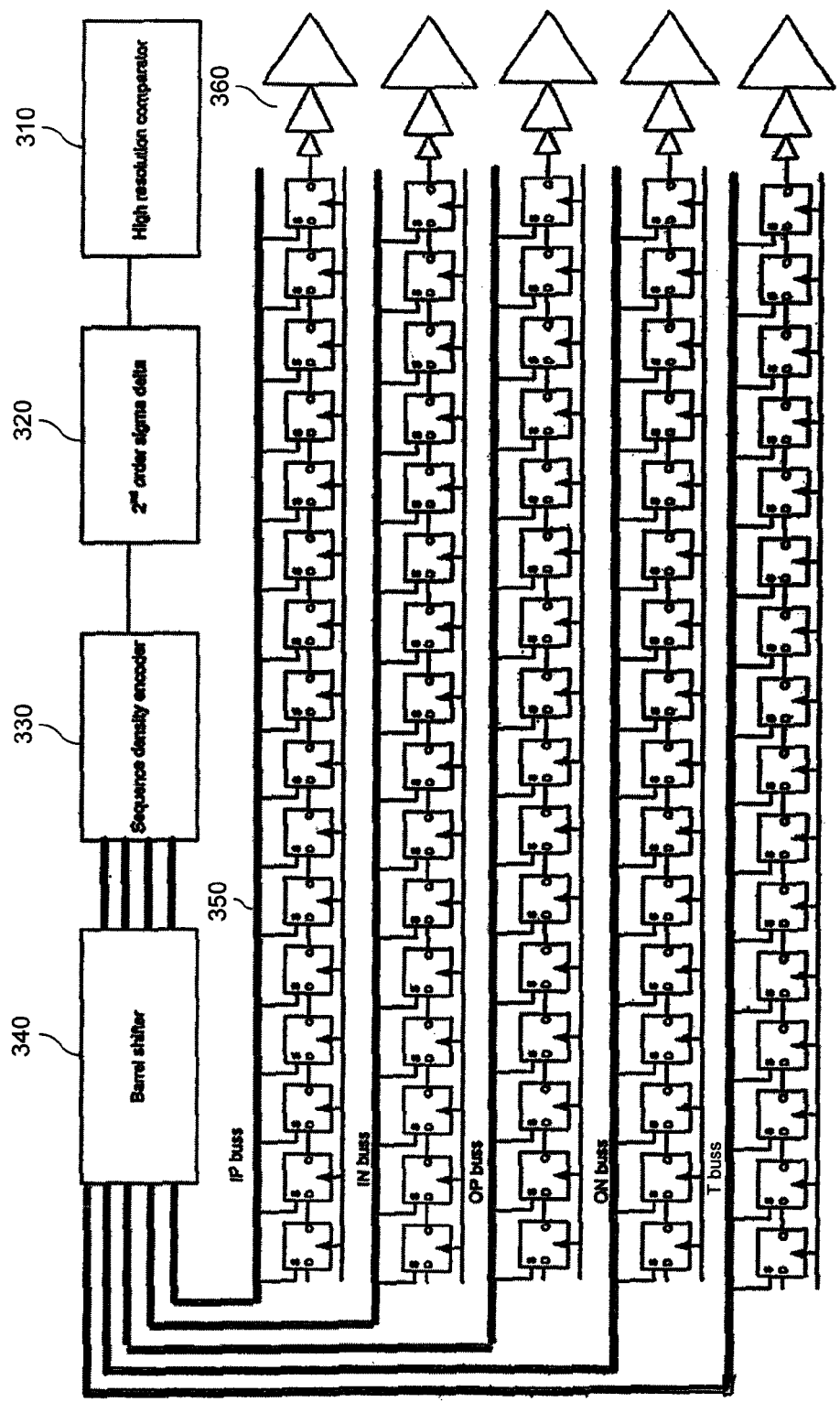
FIG. 3 is a block diagram of illustrative control circuitry for the DC-DC converter of FIG. 1.

FIG. 3 is an illustrative block diagram 300 of controller 130 for generating the control signals for converter circuit 200 so as to produce a desired output voltage. Controller 130 comprises a comparator 310, a second order sigma delta converter 320, a sequence density encoder 330, a barrel shifter 340, a shift register 350, and output drivers 360. Illustratively, The shift register is 19 bits wide with one bit for each of the 19 input transistor switches IPn, INn, output transistor switches OPn, ONn, and series connection transistor switches Tn of converter circuit 200. Illustratively, the shift register is 16 bits long.

Advantageously, shift register 350 has a set input that can be used at the start of operations to load any pattern of 1's and 0's that specify whether the transistor switches are operating or not-operating. In the case of the buck converter, the duty cycle length and therefore the output voltage VCC can be modified by altering the length of time that the IPn transistor switches are conducting. Likewise, in the case of the boost converter, the output voltage VCC can be modified by controlling the ONn switches. In either case, by comparing the output voltage VCC with a reference voltage, comparator 310 can determine if the output voltage needs to be raised or lowered and can alter the operation of the appropriate switches to reduce any difference between the output voltage and the reference voltage.

The sigma delta converter makes it possible to achieve very high voltage resolution Since the natural filtering of the LC combination that is used in the DC-DC converter is second 1 sequence at the same location, the barrel shifter 340 moves the location in the switching cycle at which the 1 sequence begins, cycling through the pattern. This spreads the frequency of the switching of the base frequency of the shift register, i.e. 320 MHz. This is a much more effective then spreading the clock noise using the base frequency of the switcher which is only 20 MHz. TABLE 2 shows the shifting in the switching cycle of the time at which the 1 sequence begins.

TABLE 2

| | parallel buck mode $2/16$ power | | | | | | | | | | | | | | | | parallel buck mode $2/16$ power | | | | | | | | | |
|---|---|---|---|---|---|---|---|---|---|---|---|---|---|---|---|---|---|---|---|---|---|---|---|---|---|---|
| | P1 | P2 | P3 | P4 | P5 | P6 | P7 | P8 | P9 | P10 | P11 | P12 | P13 | P14 | P15 | P16 | P1 | P2 | P3 | P4 | P5 | P6 | P7 | P8 | P9 | P10 |
| IP1 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 | 0 | 0 | 0 |
| IP2 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 | 0 | 0 | 0 |
| IP3 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 | 0 | 0 | 0 |
| IP4 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 | 0 | 0 | 0 |
| IN1 | 1 | 1 | 1 | 1 | 1 | 1 | 1 | 0 | 0 | 0 | 0 | 1 | 1 | 1 | 1 | 1 | 1 | 1 | 1 | 1 | 1 | 1 | 1 | 1 | 1 | 1 |
| IN2 | 1 | 1 | 1 | 1 | 1 | 1 | 1 | 0 | 0 | 0 | 0 | 1 | 1 | 1 | 1 | 1 | 1 | 1 | 1 | 1 | 1 | 1 | 1 | 1 | 1 | 1 |
| IN3 | 1 | 1 | 1 | 1 | 1 | 1 | 1 | 0 | 0 | 0 | 0 | 1 | 1 | 1 | 1 | 1 | 1 | 1 | 1 | 1 | 1 | 1 | 1 | 1 | 1 | 1 |
| IN4 | 1 | 1 | 1 | 1 | 1 | 1 | 1 | 0 | 0 | 0 | 0 | 1 | 1 | 1 | 1 | 1 | 1 | 1 | 1 | 1 | 1 | 1 | 1 | 1 | 1 | 1 |
| OP1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| OP2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| OP3 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| OP4 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| ON1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| ON2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| ON3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| ON4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| T1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| T2 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| T3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| T4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| | parallel buck mode $2/16$ power | | | | | | parallel buck mode $2/16$ power | | | | | | | | | | | | | |
|---|---|---|---|---|---|---|---|---|---|---|---|---|---|---|---|---|---|---|---|---|
| | P11 | P12 | P13 | P14 | P15 | P16 | P1 | P2 | P3 | P4 | P5 | P6 | P7 | P8 | P9 | P10 | P11 | P12 | P13 | P14 |
| IP1 | 0 | 0 | 1 | 1 | 0 | 0 | 0 | 0 | 0 | 1 | 1 | 0 | 0 | 0 | 0 | 0 | 0 | 0 | 0 | 0 |
| IP2 | 0 | 0 | 1 | 1 | 0 | 0 | 0 | 0 | 0 | 1 | 1 | 0 | 0 | 0 | 0 | 0 | 0 | 0 | 0 | 0 |
| IP3 | 0 | 0 | 1 | 1 | 0 | 0 | 0 | 0 | 0 | 1 | 1 | 0 | 0 | 0 | 0 | 0 | 0 | 0 | 0 | 0 |
| IP4 | 0 | 0 | 1 | 1 | 0 | 0 | 0 | 0 | 0 | 1 | 1 | 0 | 0 | 0 | 0 | 0 | 0 | 0 | 0 | 0 |
| IN1 | 1 | 0 | 0 | 0 | 0 | 1 | 1 | 1 | 0 | 0 | 0 | 0 | 1 | 1 | 1 | 1 | 1 | 1 | 1 | 1 |
| IN2 | 1 | 0 | 0 | 0 | 0 | 1 | 1 | 1 | 0 | 0 | 0 | 0 | 1 | 1 | 1 | 1 | 1 | 1 | 1 | 1 |
| IN3 | 1 | 0 | 0 | 0 | 0 | 1 | 1 | 1 | 0 | 0 | 0 | 0 | 1 | 1 | 1 | 1 | 1 | 1 | 1 | 1 |
| IN4 | 1 | 0 | 0 | 0 | 0 | 1 | 1 | 1 | 0 | 0 | 0 | 0 | 1 | 1 | 1 | 1 | 1 | 1 | 1 | 1 |
| OP1 | 1 | 1 | 1 | 1 | 1 | 1 | 1 | 1 | 1 | 1 | 1 | 1 | 1 | 1 | 1 | 1 | 1 | 1 | 1 | 1 |
| OP2 | 1 | 1 | 1 | 1 | 1 | 1 | 1 | 1 | 1 | 1 | 1 | 1 | 1 | 1 | 1 | 1 | 1 | 1 | 1 | 1 |
| OP3 | 1 | 1 | 1 | 1 | 1 | 1 | 1 | 1 | 1 | 1 | 1 | 1 | 1 | 1 | 1 | 1 | 1 | 1 | 1 | 1 |
| OP4 | 1 | 1 | 1 | 1 | 1 | 1 | 1 | 1 | 1 | 1 | 1 | 1 | 1 | 1 | 1 | 1 | 1 | 1 | 1 | 1 |
| ON1 | 0 | 0 | 0 | 0 | 0 | 0 | 0 | 0 | 0 | 0 | 0 | 0 | 0 | 0 | 0 | 0 | 0 | 0 | 0 | 0 |
| ON2 | 0 | 0 | 0 | 0 | 0 | 0 | 0 | 0 | 0 | 0 | 0 | 0 | 0 | 0 | 0 | 0 | 0 | 0 | 0 | 0 |
| ON3 | 0 | 0 | 0 | 0 | 0 | 0 | 0 | 0 | 0 | 0 | 0 | 0 | 0 | 0 | 0 | 0 | 0 | 0 | 0 | 0 |
| ON4 | 0 | 0 | 0 | 0 | 0 | 0 | 0 | 0 | 0 | 0 | 0 | 0 | 0 | 0 | 0 | 0 | 0 | 0 | 0 | 0 |
| T1 | 0 | 0 | 0 | 0 | 0 | 0 | 0 | 0 | 0 | 0 | 0 | 0 | 0 | 0 | 0 | 0 | 0 | 0 | 0 | 0 |
| T2 | 0 | 0 | 0 | 0 | 0 | 0 | 0 | 0 | 0 | 0 | 0 | 0 | 0 | 0 | 0 | 0 | 0 | 0 | 0 | 0 |
| T3 | 0 | 0 | 0 | 0 | 0 | 0 | 0 | 0 | 0 | 0 | 0 | 0 | 0 | 0 | 0 | 0 | 0 | 0 | 0 | 0 |
| T4 | 0 | 0 | 0 | 0 | 0 | 0 | 0 | 0 | 0 | 0 | 0 | 0 | 0 | 0 | 0 | 0 | 0 | 0 | 0 | 0 | order, a second order sigma delta converter is a natural choice for use as the feedback unit in the controller. When using 16 bit shift register length with second order sigma delta, better than 10 µV resolution can be obtained when a 320 MHz clock is used for the shift register and the LC corner frequency is 1.9 MHz. As a result, better than 14 bit resolution is possible within 1.9 MHz bandwidth which is enough to cover WCDMA amplitude modulation directly at the PA drain while maintaining noise below the noise floor requirement.

To avoid frequency tones being generated by the clock which would appear if the clock generator always started the The clock generator allows the DC-DC switcher to shift from parallel to serial operation seamless by simply loading the correct pattern into the shift register. It should be noted that the calculation of the density pattern, barrel shifting, SD operation and comparator feedback is happening only once during the pattern, so at 20 MHz in our example, even through the basic time resolution, the frequency spreading and the amplitude resolution are based on the 320 MHz used in the shift register. This in total allows to realize a very high resolution fast DC-DC converter will only small digital overhead. TABLE 3 shows seamless mode switching from parallel to serial operation.

TABLE 3 parallel buck mode
1/16 power

|     | P1 | P2 | P3 | P4 | P5 | P6 | P7 | P8 | P9 | P10 | P11 | P12 | P13 | P14 | P15 | P16 |
|-----|----|----|----|----|----|----|----|----|----|-----|-----|-----|-----|-----|-----|-----|
| IP1 | 1  | 0  | 0  | 0  | 0  | 0  | 0  | 0  | 0  | 0   | 0   | 0   | 0   | 0   | 0   | 0   |
| IP2 | 1  | 0  | 0  | 0  | 0  | 0  | 0  | 0  | 0  | 0   | 0   | 0   | 0   | 0   | 0   | 0   |
| IP3 | 1  | 0  | 0  | 0  | 0  | 0  | 0  | 0  | 0  | 0   | 0   | 0   | 0   | 0   | 0   | 0   |
| IP4 | 1  | 0  | 0  | 0  | 0  | 0  | 0  | 0  | 0  | 0   | 0   | 0   | 0   | 0   | 0   | 0   |
| IN1 | 0  | 0  | 1  | 1  | 1  | 1  | 1  | 1  | 1  | 1   | 1   | 1   | 1   | 1   | 1   | 0   |
| IN2 | 0  | 0  | 1  | 1  | 1  | 1  | 1  | 1  | 1  | 1   | 1   | 1   | 1   | 1   | 1   | 0   |
| IN3 | 0  | 0  | 1  | 1  | 1  | 1  | 1  | 1  | 1  | 1   | 1   | 1   | 1   | 1   | 1   | 0   |
| IN4 | 0  | 0  | 1  | 1  | 1  | 1  | 1  | 1  | 1  | 1   | 1   | 1   | 1   | 1   | 1   | 0   |
| OP1 | 1  | 1  | 1  | 1  | 1  | 1  | 1  | 1  | 1  | 1   | 1   | 1   | 1   | 1   | 1   | 1   |
| OP2 | 1  | 1  | 1  | 1  | 1  | 1  | 1  | 1  | 1  | 1   | 1   | 1   | 1   | 1   | 1   | 1   |
| OP3 | 1  | 1  | 1  | 1  | 1  | 1  | 1  | 1  | 1  | 1   | 1   | 1   | 1   | 1   | 1   | 1   |
| OP4 | 1  | 1  | 1  | 1  | 1  | 1  | 1  | 1  | 1  | 1   | 1   | 1   | 1   | 1   | 1   | 1   |
| ON1 | 0  | 0  | 0  | 0  | 0  | 0  | 0  | 0  | 0  | 0   | 0   | 0   | 0   | 0   | 0   | 0   |
| ON2 | 0  | 0  | 0  | 0  | 0  | 0  | 0  | 0  | 0  | 0   | 0   | 0   | 0   | 0   | 0   | 0   |
| ON3 | 0  | 0  | 0  | 0  | 0  | 0  | 0  | 0  | 0  | 0   | 0   | 0   | 0   | 0   | 0   | 0   |
| ON4 | 0  | 0  | 0  | 0  | 0  | 0  | 0  | 0  | 0  | 0   | 0   | 0   | 0   | 0   | 0   | 0   |
| T1  | 0  | 0  | 0  | 0  | 0  | 0  | 0  | 0  | 0  | 0   | 0   | 0   | 0   | 0   | 0   | 0   |
| T2  | 0  | 0  | 0  | 0  | 0  | 0  | 0  | 0  | 0  | 0   | 0   | 0   | 0   | 0   | 0   | 0   |
| T3  | 0  | 0  | 0  | 0  | 0  | 0  | 0  | 0  | 0  | 0   | 0   | 0   | 0   | 0   | 0   | 0   | series buck mode
5/16 power

|     | P1 | P2 | P3 | P4 | P5 | P6 | P7 | P8 | P9 | P10 | P11 | P12 | P13 | P14 | P15 | P16 |
|-----|----|----|----|----|----|----|----|----|----|-----|-----|-----|-----|-----|-----|-----|
| IP1 | 1  | 1  | 1  | 1  | 1  | 0  | 0  | 0  | 0  | 0   | 0   | 0   | 0   | 0   | 0   | 0   |
| IP2 | 0  | 0  | 0  | 0  | 0  | 0  | 0  | 0  | 0  | 0   | 0   | 0   | 0   | 0   | 0   | 0   |
| IP3 | 0  | 0  | 0  | 0  | 0  | 0  | 0  | 0  | 0  | 0   | 0   | 0   | 0   | 0   | 0   | 0   |
| IP4 | 0  | 0  | 0  | 0  | 0  | 0  | 0  | 0  | 0  | 0   | 0   | 0   | 0   | 0   | 0   | 0   |
| IN1 | 0  | 0  | 0  | 0  | 0  | 0  | 0  | 0  | 0  | 0   | 0   | 0   | 0   | 0   | 0   | 0   |
| IN2 | 0  | 0  | 0  | 0  | 0  | 0  | 0  | 0  | 0  | 0   | 0   | 0   | 0   | 0   | 0   | 0   |
| IN3 | 0  | 0  | 0  | 0  | 0  | 0  | 0  | 0  | 0  | 0   | 0   | 0   | 0   | 0   | 0   | 0   |
| IN4 | 0  | 0  | 0  | 0  | 0  | 0  | 1  | 1  | 1  | 1   | 1   | 1   | 1   | 1   | 1   | 0   |
| OP1 | 1  | 1  | 1  | 1  | 1  | 1  | 1  | 1  | 1  | 1   | 1   | 1   | 1   | 1   | 1   | 1   |
| OP2 | 1  | 1  | 1  | 1  | 1  | 1  | 1  | 1  | 1  | 1   | 1   | 1   | 1   | 1   | 1   | 1   |
| OP3 | 1  | 1  | 1  | 1  | 1  | 1  | 1  | 1  | 1  | 1   | 1   | 1   | 1   | 1   | 1   | 1   |
| OP4 | 1  | 1  | 1  | 1  | 1  | 1  | 1  | 1  | 1  | 1   | 1   | 1   | 1   | 1   | 1   | 1   |
| ON1 | 0  | 0  | 0  | 0  | 0  | 0  | 0  | 0  | 0  | 0   | 0   | 0   | 0   | 0   | 0   | 0   |
| ON2 | 0  | 0  | 0  | 0  | 0  | 0  | 0  | 0  | 0  | 0   | 0   | 0   | 0   | 0   | 0   | 0   |
| ON3 | 0  | 0  | 0  | 0  | 0  | 0  | 0  | 0  | 0  | 0   | 0   | 0   | 0   | 0   | 0   | 0   |
| ON4 | 0  | 0  | 0  | 0  | 0  | 0  | 0  | 0  | 0  | 0   | 0   | 0   | 0   | 0   | 0   | 0   |
| T1  | 1  | 1  | 1  | 1  | 1  | 1  | 1  | 1  | 1  | 1   | 1   | 1   | 1   | 1   | 1   | 1   |
| T2  | 1  | 1  | 1  | 1  | 1  | 1  | 1  | 1  | 1  | 1   | 1   | 1   | 1   | 1   | 1   | 1   |
| T3  | 1  | 1  | 1  | 1  | 1  | 1  | 1  | 1  | 1  | 1   | 1   | 1   | 1   | 1   | 1   | 1   |

As will be apparent to those skilled in the art, numerous variations may be practiced within the spirit and scope of the present invention. For example, while the invention may be practiced using inductors that all have the same inductance, the invention may also be practiced using inductors having different inductance values. And while converter circuit 200 has been described for the case where the converter circuit has four inductors, the invention may also be practiced for converter circuits having other numbers of inductors. For example, two inductors may be used each having input switches and output switches with a connection switch that permits the inductors to be connected in parallel or in series. Converter circuits with other numbers of inductors may also be used. Other switching arrangements may also be used to connect the inductors in parallel, series/parallel, and series configurations. Likewise, other switching arrangements can be used to make power and/or ground connections. For example in operating the buck converter in serial mode, instead of grounding the input of the first inductor during the remainder of the period T, the input of any or all of the inductors could be grounded.

Other implementations of controller 130 will also be apparent to those skilled in the art from the foregoing description of the control signals that are generated by the controller.

What is claimed is:

1. Apparatus comprising;
   first and second nodes;
   at least first and second inductors, each having an input and an output;
   a first input switch connected between the first node and the input of the first inductor;
   a second input switch connected between the first node and the input of the second inductor;
   a first output switch connected between the second node and the output of the first inductor;
   a second output switch connected between the second node and the output of the second inductor; and
   a third output switch connected between the output of the first inductor and the input of the second inductor
   whereby the first and second inductors are selectively combined to form between the first and second nodes a parallel combination of the first and second inductors or a series combination of the first and second inductors.

2. The apparatus of claim 1 further comprising third and fourth inductors, each having an input and an output, a third input switch connected between the first node and the input of the third inductor, and a fourth input switch connected between the first node and the input of the fourth inductor.

3. The apparatus of claim 2 further comprising a fourth output switch connected between the second node and the output of the third inductor, a fifth output switch connected between the second node and the output of the fourth inductor, a sixth output switch connected between the output of the second inductor and the input of the third inductor, and a seventh output switch connected between the output of the third inductor and the input of the fourth inductor wherein the switches selectively combine the outputs of the inductors to form between the first and second nodes a parallel combination of the inductors, a series combination of the inductors, or a series/parallel combination of the inductors.

4. The apparatus of claim 1 wherein the input switches selectively apply to the input of an inductor a voltage of a first polarity or a voltage of a second polarity.

5. The apparatus of claim 4 wherein one of the voltage of the first polarity and the voltage of the second polarity is ground.

6. Apparatus comprising;
first and second nodes;
at least first, second, third and fourth inductors, each having an input and an output;
a first input switch connected between the first node and the input of the first inductor;
a second input switch connected between the first node and the input of the second inductor;
a third input switch connected between the first node and the input of the third inductor;
a fourth input switch connected between the first node and the input of the fourth inductor;
a first output switch connected between the second node and the output of the first inductor;
a second output switch connected between the second node and the output of the second inductor;
a third output switch connected between the second node and the output of the third inductor;
a fourth output switch connected between the second node and the output of the fourth inductor;
a fifth output switch connected between the output of the first inductor and the input of the second inductor;
a sixth output switch connected between the output of the second inductor and the input of the third inductor; and
a seventh output switch connected between the output of the third inductor and the input of the fourth inductor;
wherein the input switches and the output switches are operable to selectively combine the first, second, third and fourth inductors between the first and second nodes in a parallel combination of the inductors, a series combination of the inductors, or a series/parallel combination of the inductors.

7. The apparatus of claim 6 wherein the input switches selectively apply to the input of an inductor a voltage of a first polarity or a voltage of a second polarity.

8. The apparatus of claim 7 wherein one of the voltage of the first polarity and the voltage of the second polarity is ground.

9. A direct current to direct current (DCDC) voltage converter comprising:
at least one circuit comprising
first and second nodes;
at least first and second inductors, each having an input and an output;
a first input switch connected between the first node and the input of the first inductor;
a second input switch connected between the first node and the input of the second inductor;
a first output switch connected between the second node and the output of the first inductor;
a second output switch connected between the second node and the output of the second inductor; and
a third output switch connected between the output of the first inductor and the input of the second inductor
whereby the first and second inductors may be selectively combined by operation of the switches to form between the first and second nodes a parallel combination of the first and second inductors or a series combination of the first and second inductors; and
a controller for selectively operating the input switches and the output switches to produce a parallel combination of the first and second inductors or a series combination of the first and second inductors.

10. The voltage converter of claim 9 wherein said at least one circuit is operated as a boost circuit.

11. The voltage converter of claim 9 wherein said at least one circuit is operated as a buck circuit.

12. A method of controlling a direct current (DCDC) voltage converter comprising at least one circuit for generating a output voltage, said at least one circuit comprising
first and second nodes;
at least first and second inductors, each having an input and an output;
a first input switch connected between the first node and the input of the first inductor;
a second input switch connected between the first node and the input of the second inductor; and
a first output switch connected between the second node and the output of the first inductor;
a second output switch connected between the second node and the output of the second inductor; and
a third output switch connected between the output of the first inductor and the input of the second inductor
whereby the inductors may be selectively combined by operation of the switches to form between the first and second nodes a parallel combination of the first and second inductors or a serial combination of the first and second inductors;
said method comprising:
loading into a shift register a pattern of control signals for controlling the first and second input switches and the first, second and third output switches;
successively using the control signals to drive the first and second input switches and the first, second and third output switches so as to generate an output voltage;
comparing the output voltage that is generated with a reference voltage; and
modifying the pattern of control signals that is loaded into the shift register so as to reduce any difference between the output voltage and the reference voltage.

13. The method of claim 12 further comprising varying the time in a duty cycle at which the input switches and/or output switches are made conducting.

14. The method of claim 12 further comprising shifting from a parallel combination of inductors to a serial combination of inductors by first loading into the shift register a first pattern of control signals for controlling the first and second input switches and the first, second and third output switches so that the inductors operate in a parallel combination and immediately thereafter loading into the shift register a second pattern of control signals for controlling the first and second input switches and the first, second and third output switches so that the inductors operate in serial combination.

15. The method of claim 12 further comprising shifting from a serial combination of inductors to a parallel combination of inductors by first loading into the shift register a first pattern of control signals for controlling the first and second input switches and the first, second and third output switches so that the inductors operate in a serial combination and immediately thereafter loading into the shift register a second pattern of control signals for controlling the first and second input switches and the first, second and third output switches so that the inductors operate in a parallel combination.

16. The apparatus of claim 1 wherein the first output switch selectively couples the first inductor to an output terminal or to ground.

17. The apparatus of claim 16 further comprising a capacitor coupled between the output terminal and ground.

18. The voltage converter of claim 9 wherein the first output switch selectively couples the first inductor to an output terminal or to ground.

19. The voltage converter of claim 18 further comprising a capacitor coupled between the power supply output terminals.

20. The voltage converter of claim 9 further comprising:

a shift register for receiving a pattern of control signals for controlling the first and second input switches and the first, second and third output switches;

a comparator for comparing an output voltage from the output switches with a reference voltage; and a feedback circuit for modifying the pattern of control signals that is loaded into the shift register so as to reduce any difference between the output voltage and the reference voltage.

21. The apparatus of claims 6 wherein when the first, second, third and fourth input switches and the first, second, third and fourth output switches are conducting, the first, second, third and fourth inductors are connected in parallel, and when the first input switch and the fourth, fifth, sixth and seventh output switches are conducting the first, second, third and fourth inductors are connected in series.

* * * * *